Sept. 28, 1926.  
C. McG. SYKES  
1,601,459  
SEMIAUTOMATIC DIAL WEIGHING MECHANISM  
Filed May 6, 1922  2 Sheets-Sheet 1

Sept. 28, 1926.  
C. McG. SYKES  
1,601,459  
SEMIAUTOMATIC DIAL WEIGHING MECHANISM  
Filed May 6, 1922  
2 Sheets-Sheet 2

Patented Sept. 28, 1926.

1,601,459

UNITED STATES PATENT OFFICE.

CAMERON McGREGOR SYKES, OF BIRMINGHAM, ENGLAND, ASSIGNOR TO W. & T. AVERY, LIMITED, OF BIRMINGHAM, ENGLAND.

SEMIAUTOMATIC DIAL WEIGHING MECHANISM.

Application filed May 6, 1922, Serial No. 558,989, and in Great Britain February 23, 1921.

This invention has reference to improvements in semi-automatic dial weighing mechanism, and has for its object to simplify and improve mechanism of this character whereby a more accurate weight indication is obtained and a clearer indication of the weights are visible on the dial. The present invention combines a steelyard and poise weight mechanism with a dial indicator in such a manner that the minor weight is obtained by means of an index pointer moving over a dial and registering against weight graduations thereon, and the major weight is obtained by means of numerals on a steelyard, this numeral being read in conjunction with the indicated weight graduation on the dial.

The present invention consists of a semi-automatic dial weighing mechanism of the character hereinbefore referred to, wherein the load applied to the machine is initially automatically balanced by a resistant, the load being subsequently transferred without shock to the dial indicating mechanism as determined by the automatically controlled weight selection device. The present invention further resides in improvements in the details of construction and operation of the aforesaid mechanism as will hereinafter more fully appear.

The present invention will now be described in conjunction with the accompanying sheet of drawings which illustrate as much of the weighing scale mechanism as is necessary to a complete understanding of the features comprising the present invention. In the drawings similar reference numerals indicate similar parts in the several views.

Figure 1:
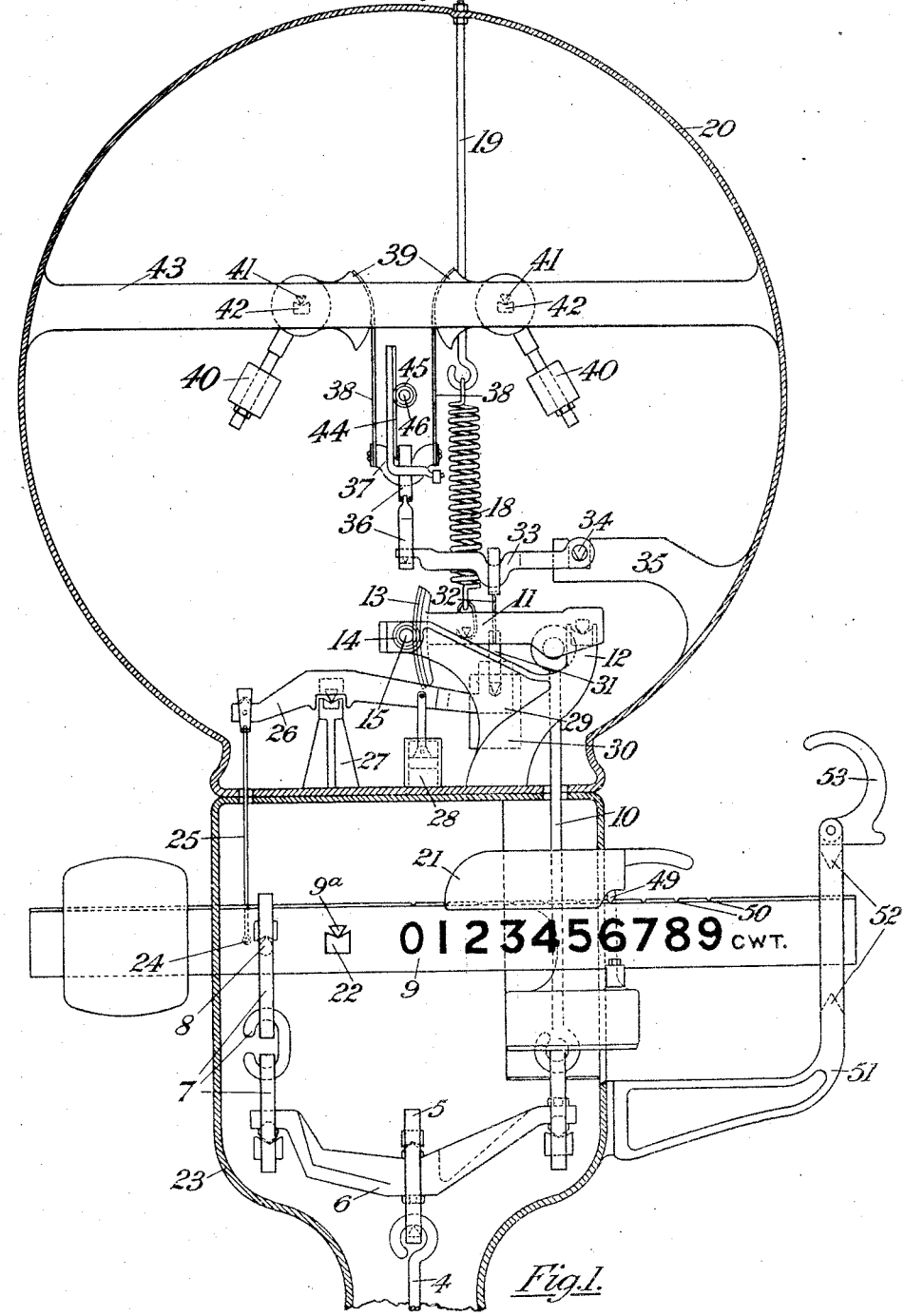
Fig. 1 is a front elevation to an enlarged scale of the steelyard and dial indicating mechanism in the position seen in Fig. 3 but with the dial and front cover plate removed.

The platform or weighbridge to which the load is applied is connected in the ordinary manner to a connecting rod 4. This connecting rod is suspended by means of the link 5 to the centre knife-edge of a lever 6, the lever 6 is in turn suspended at the one end by means of links 7 from the back knife-edge 8 of the steelyard 9, and at its other end by means of the connecting rod 10 from a lever 11. The lever 11 is fulcrumed by means of a knife-edge on the bracket 12 mounted on the scale housing and has at its other end a toothed segment 13 meshing with a pinion 14 mounted on a spindle 15 on the bracket 12. Secured to the spindle 15 is the index pointer 16 which indicates against the numerals on the small dial 17 for a purpose which will be hereinafter described. The lever 11 is connected by means of a link to the coil spring 18 which is suspended at its other end from the rod 19 mounted in the dial housing 20. The spring 10 forms the automatic resistant for any load which is applied to the weighing platform within the capacity of the scale and serves to determine the positioning of the poise weight 21 upon the steelyard 9 as will be explained later. The steelyard 9 is fulcrumed by the knife-edge 9ª upon the bearings 22 mounted in the head of the pillar 23 within which the steelyard is located. Projecting from the rear face of the steelyard 9 is a horizontal pin 24 to which is connected the vertical rod 25 which in turn is suspended from the one arm of a lever 26 which is fulcrumed on the bracket 27 mounted on the base of the dial housing 20. Connected to the other arm of this lever 26 is a dashpot or motion steadying device 28 and the extremity of this arm of the lever is connected by means of a knife-edge 29 with a weight 30 which is formed integral with the link 31. The link 31 is in turn dependent by means of the link 32 from a lever 33 which is fulcrumed by means of a knife-edge 34 on the bracket 35 secured to the side of the dial housing 20. This lever 33 is suspended at its outer end from the links 36 the upper one of which is mounted on a central knife-edge of a yoke 37 which has connection at both ends by means of flexible nickeled steel ribbons 38 to the cams 39 to which are secured the overweighted pendulous resistant weights 40 which form the automatic weighing resistance for the minor order of weighment. The cams and pendulums are mounted by means of knife-edges 41 upon bearings 42 in the cross bars 43 forming part of the dial housing 20. Pivotally mounted on the yoke 37 is a weighted rack 44 which meshes with a pinion 45 mounted on a spindle 46, and connected to the spindle 46 is the index finger 47 which automatically indicates the minor order of weighment.

Figures 2, 3:
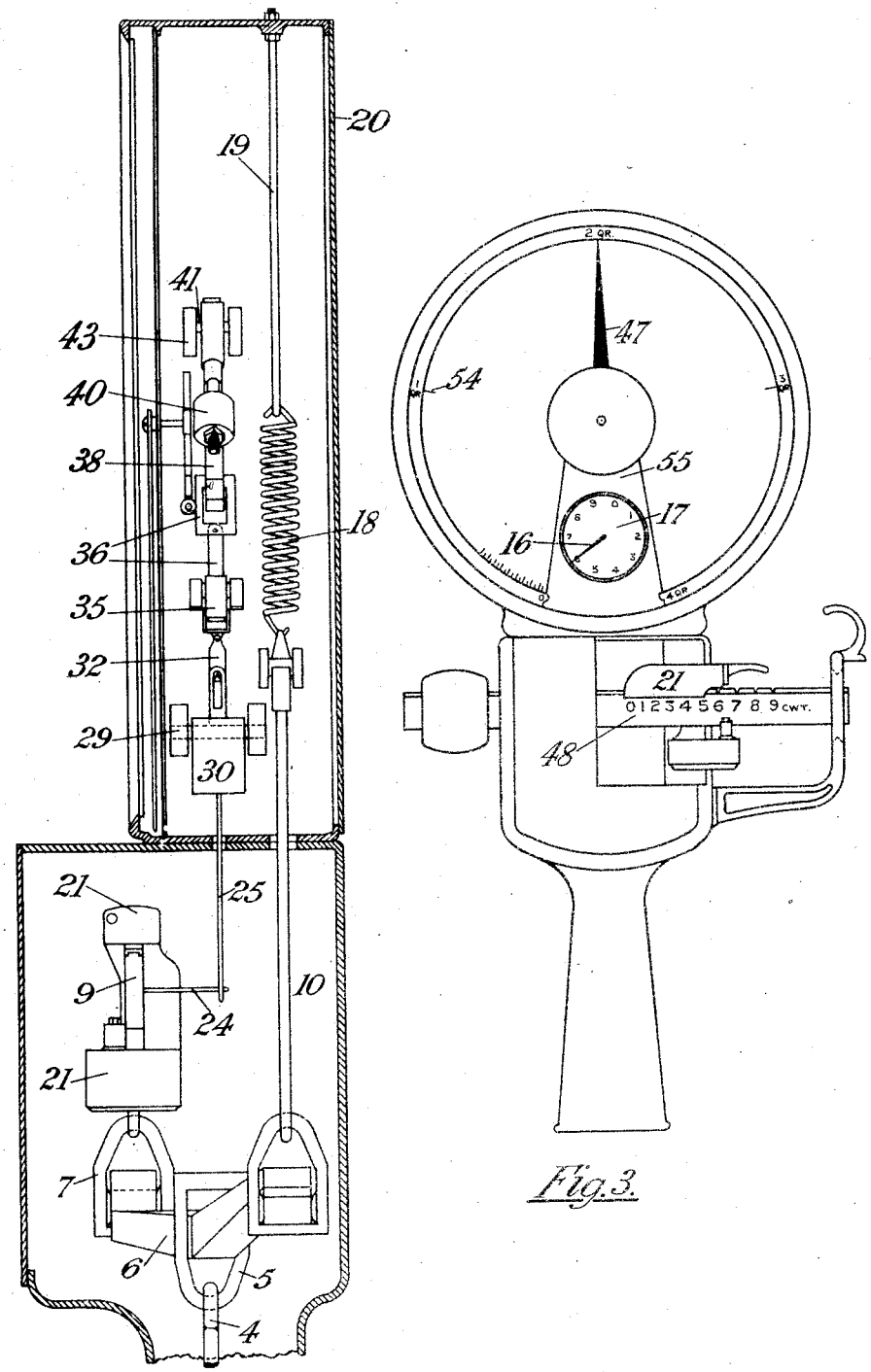
Fig. 2 is a part sectional end elevation of Fig. 1.
Fig. 3 is a front elevation in outline of the pillar steelyard and automatic dial indicating mechanism.

The major order of weighment is indicated by means of the graduations 48 on the steelyard 9 according to the position of the poise weight 21 the poise weight being located in the ordinary manner by means of the nib 49 which is adapted to be located in any one of the notches 50 of the steelyard 9. The free end of the long arm of the steelyard 9 is located within an end aperture in the bracket 51 and has limited motion therein determined by the stops 52; this steelyard can be locked in position within the bracket 51 by means of the tumbler 53. The operation of the scale is as follows: Upon application of a load to the weighing platform the weight is transmitted through the connecting rod 4 to the lever 6 and is simultaneously distributed by this lever to the steelyard and to the spring, the poise weight being at the zero position, the steelyard 9 now rises at the free end of the long arm to contact with the top stop 52 and if the load exceeds one hundred weight the index pointer 47 traverses the whole course of the minor orders weight dial 54 and is located out of vision behind the shutter 55. The short arm of the steelyard 9 has now fallen to its full limit and the knife-edge 8 now forms a fixed point of suspension for the left hand end of the lever 6. In consequence the load on the weighing platform is wholly transmitted through the connecting rod 10, lever 11 to the coil spring 18 which forms the rough or approximate automatic weighing resistant for the whole of the load within the total capacity of the scale. The load has now extended the coil spring 18 an amount equivalent to that of the load and has imparted a rotary motion to the toothed segment 13 at the left hand end of the lever 11, consequently rotating the pinion 14 and moving the index pointer 16 around the face of the small dial 17. This dial is provided with a series of numerals against which the pointer 16 is adapted to register and in accordance with the position indicated by this pointer 16 the poise weight 21 is manually positioned upon the steelyard 9. For instance, by reference to Fig. 3 of the drawings, the pointer 16 is indicating against the numeral 6 on the dial 17 and accordingly the poise weight 21 has been traversed along the steelyard to the numeral 6 indicating one cwt. The balance of the weight to complete the weighing is automatically obtained by means of the pendulous resistance 40 as will now be described. The pendulous weights 40 are equal to the weight between any two notches 50 of the steelyard 9, in the case under review one cwt., so that by moving the poise weight 21 to indicate six cwt., the steelyard 9 is brought to the central position between the limiting stops 52 in the aperture of the bracket 51 and the balance of the load to complete the weighment is now transmitted through the left hand arm of the lever 6 and links 7, steelyard 9, pin 24, rod 25, lever 26, links 31 and 32, lever 33, links 36, yoke 37, flexible ribbons 38, cam 39 to the pendulums 40. This minor part of the load causes the pendulums to swing toward each other and automatically counterbalance the remainder of the load over and above the major amount of six cwt. This movement of the pendulums 40 through their connections to the yoke 37 has caused the rack 44 to rotate the pinion 45 and traverse the index pointer 47 across the minor weight divisions on the large dial 54 until the position of balance is obtained and the complete weighment is now completed, as to the major order by means of the indicated numeral 48 on the steelyard 9, and as to the minor order by means of the pointer 47 in relation to the graduations on the dial 54.

A scale indicating mechanism constructed and operated as herein described yields very accurate weighment for loads of a large capacity and a clear indication of the weighment, the minor order of weighment being indicated to a finer degree than obtains with dial mechanism wherein the whole of both orders of weighment are indicated upon the one dial.

By the embodiment of the automatic initial weight selection device in the mechanism a very considerable saving of time is effected in making weighments with the apparatus; and as it is only necessary to graduate the dial with the minor order of weighments a much greater distance can be obtained between each graduation than obtains in the case of dial weighing mechanism where the full load has to be marked thereon.

Claims:—

1. A weighing mechanism comprising in combination a steelyard and a poise weight mechanism mounted thereon forming a non-automatic resistant, an automatic resistant which initially balances the load applied to the mechanism, a dial indicator operated by said automatic resistant, a pendulous resistant connected to the said steelyard for automatically counterbalancing the minor order of weighment, and means whereby the load acts independently upon both the said automatic and the non-automatic resistants.

2. A semi-automatic weight indicating mechanism, comprising in combination an automatic resistant for initially counterbalancing the load, an indicator operated in consonance with said resistant, a steelyard and poise weight mechanism for counterbalancing and indicating the major order of weighment forming a non-automatic resistant, an overweighted pendulous mechanism connected to the said steelyard for automatically counterbalancing the minor order of weighment, mechanism controlled by said pendulous resistant for automatically indicating the minor order of weighment, and means whereby the load acts independently upon both the said automatic and the non-automatic resistants.

In testimony whereof, I have signed my name to this specification.

CAMERON McGREGOR SYKES.